United States Patent [19]

Cox et al.

[11] Patent Number: 5,727,080
[45] Date of Patent: Mar. 10, 1998

[54] DYNAMIC HISTOGRAM WARPING OF IMAGE HISTOGRAMS FOR CONSTANT IMAGE BRIGHTNESS, HISTOGRAM MATCHING AND HISTOGRAM SPECIFICATION

[75] Inventors: Ingemar J. Cox, Lawrenceville; Sebastien Roy, Princeton, both of N.J.

[73] Assignee: NEC Research Institute, Inc., Princeton, N.J.

[21] Appl. No.: 434,085

[22] Filed: May 3, 1995

[51] Int. Cl.$^6$ ............................................. G06K 9/46
[52] U.S. Cl. ............................. 382/168; 382/169
[58] Field of Search ........................... 382/168, 169, 382/274, 276; 358/455, 461; 345/147

[56] References Cited

U.S. PATENT DOCUMENTS

| | | | |
|---|---|---|---|
| 4,792,979 | 12/1988 | Nomura et al. | 382/169 |
| 5,053,888 | 10/1991 | Nomura | 358/458 |
| 5,296,941 | 3/1994 | Izawa et al. | 382/169 |
| 5,383,013 | 1/1995 | Cox | 356/2 |

OTHER PUBLICATIONS

M.A. Gennert, "A Computational Framework for Understanding Problems in Stereo Vision," PhD Thesis Dept. of Electrical Engineering and Computer Science, M.I.T., Sep. 1987, Chapter 4 (86–102).

I.J. Cox et al, "Stereo Without Disparity Gradient Smoothing: A Bayesian Sensor Fusion Solution," in British Machine Vision Conf. (Springer Verlag, 1992) pp. 337–346.

I.J. Cox, "A Maximum Likelihood N–Camera Stereo Algorithm," in 1994 IEEE Computer Society Conf. on Computer Vision and Pattern Recognition, Jun. 21–23, 1994, pp. 733–739.

R.C. Gonzales and R.E. Woods, "Digital Image Processing," Addison–Wesley Publishing, New York, 1993, pp.171–185.

X–D. Yang et al, "Direct Mapping Between Histograms: An Improved Interactive Image Enhancement Method," in IEEE Int'l Conf. On Systems, Man & Cybernetics, 1991, pp. 243–247.

Y.J. Zhang, "Improving the Accuracy of Direct Histogram Specification," in Electronics Letters, vol. 28 Jan. 30, 1992, pp. 213–214.

L. Raiha, "Approximate Sequence Comparison: A Study with Histograms," in Pattern Recognition, vol. 12, 1990, pp. 159–169.

W.A. Gale et al, "A Program for Aligning Sentences in Bilingual Corpora," in Proc. Of 29th Annual Meeting of Association for Computational Linguistics, pp. 177–184, 1991.

J.B. Kruskal et al, "The Symetric Time–Warping Problem: From Continuous to Discrete," in *Time Warps, String Edits, and: Macromolecules The Theory and Practice of Sequence Comparison* (Reading, MA: Addison Wesley, 1983), pp. 125–161.

*Primary Examiner*—Yon J. Couso
*Attorney, Agent, or Firm*—Philip J. Feig

[57] ABSTRACT

Dynamic histogram warping is performed on histograms extracted from an image pair of a scene. The warped histograms are remapped to the image pair and the resulting remapped image pair is subsequently subjected to image processing.

8 Claims, 19 Drawing Sheets

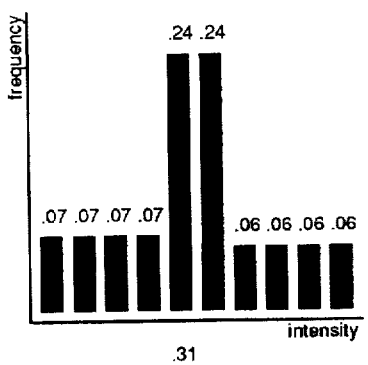
FIG 1A
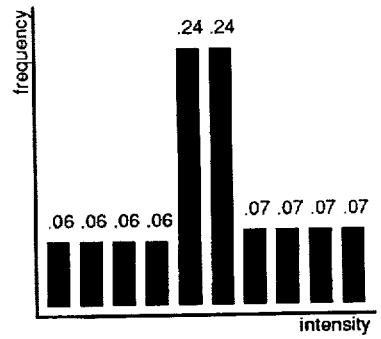
FIG 1B
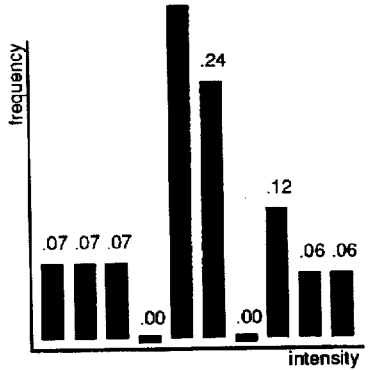
FIG 1C
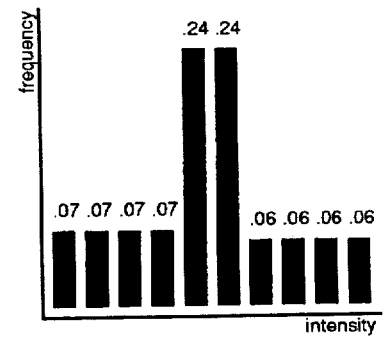
FIG 1D
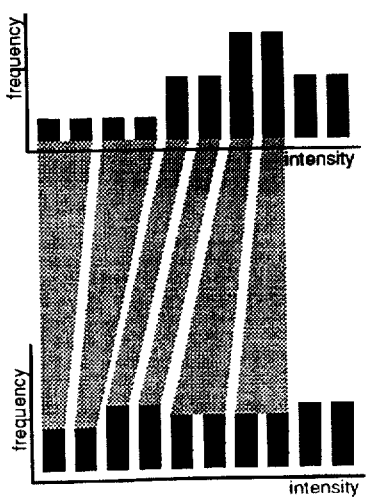
FIG 10A
FIG 10B

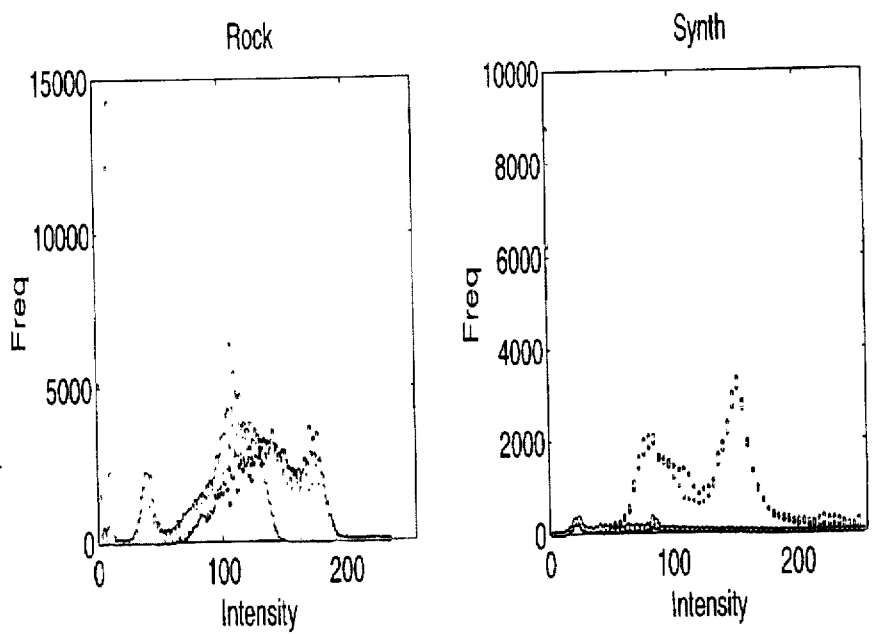
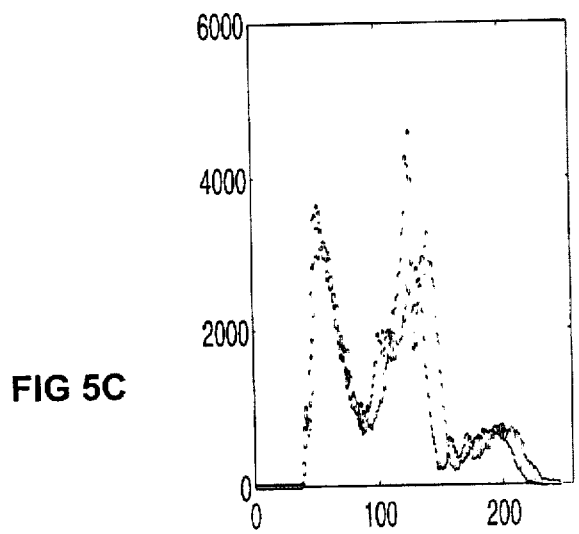
FIG 5A
FIG 5B
FIG 5C

DYNAMIC HISTOGRAM WARPING OF IMAGE HISTOGRAMS FOR CONSTANT IMAGE BRIGHTNESS, HISTOGRAM MATCHING AND HISTOGRAM SPECIFICATION

FIELD OF THE INVENTION

The present invention relates to image processing and specifically to dynamic histogram warping of image pairs for constant image brightness correction and histogram matching and specification prior to subjecting the image pair to conventional image processing.

BACKGROUND OF THE INVENTION

The constant image brightness (CIB) assumption assumes that the intensities of corresponding points (or planar patches) in two (or more) images are equal. This assumption is central to bodies of work in optical flow estimation, motion and structure, stereo and recognition based on color histograms.

While it is widely believed that the image brightness assumption is seldom met in practice, it is usually assumed that this deviation can be modeled by a simple global spatially-invariant additive constant, i.e. $I_A = I_B + \alpha$ where $I_A$ and $I_B$ are the intensities of corresponding points in a pair of images. In this case, image contrast is conserved and the DC bias is usually removed by applying a first derivative operation to both images. Any derivative operation does, of course, amplify high frequency noise and this can pose a problem for noisy images.

For pixel-based stereo, M. A. Gennert in his Ph.D. thesis at MIT in 1987 entitled "A Computational Framework for Understanding Problems in Stereo Vision" provided a detailed model of the intensity relationship between corresponding pixels, showing that corresponding intensities in the left and right images differ by a spatially varying multiplicative factor due to surface orientation and reflectance models. Later work by Cox et al first in an article entitled "Stereo without Disparity Gradient Smoothing: A Bayesian Sensor Fusion Solution" in British Machine Vision Conference, pages 337 to 346, Springer-Verlag, 1992 and later in an article entitled "A Maximum Likelihood N-Camera Stereo Algorithm" in "IEEE Conf. on Computer Vision and Pattern Recognition," pages 733 to 739, 1994, however, suggested that this relationship was over shadowed by global changes in illumination conditions and differences in camera responses that were probably the principal source of errors to the constant image brightness assumption. These changes in illumination and or camera responses were modeled by constant multiplicative and additive factors, i.e. $I_A = \beta I_B + \alpha$, that were automatically estimated by a simple analysis of the image histograms.

The inventors have observed that neither a DC bias nor a linear model adequately represents the observed relationships. A comprehensive physical model of the observed deviations is difficult to develop. In fact, it is unlikely that a single model will explain all such relationships, particularly if much of the deviations are attributable to highly nonlinear automatic gain controls common to most manufacturers' cameras.

Clearly, when the CIB assumption is valid, the intensity histograms for a pair of stereo or motion sequence images should be identical, ignoring noise and occlusion effects. However, if corresponding intensities are related by an unknown non-linear monotonically increasing relationship then the intensity histograms will suffer corresponding distortions. In accordance with the teachings of the present invention, it is proposed to estimate and correct for the unknown non-linear distortion by searching for an optimum non-linear warping of one histogram to the other, that minimizes a cost function defined hereinafter. Such a warping should consist entirely of expansion/contraction of the intensity levels in a manner analogous to the dynamic time warping of speech waveforms. These algorithms are related to the dynamic programming algorithms for stereo, but differ by replacing deletions/occlusions with expansion/contractions that allow non-unique matches. The present invention results in what will be referred to as the dynamic histogram warping.

The work described here is related to work in histogram specification such as is described in the book by R. C. Gonzales et al, entitled "Digital Image Processing," published by Addison-Wesley in 1993. Traditionally, this has been a two step process in which the two histograms are first equalized. The final mapping is computed by mapping intensities in the first histogram to their equalized value and then inverse mapping from the equalized value to the corresponding intensity value of the second histogram. Yang et al in an article entitled "Direct Mapping Between Histograms: An Improved Interactive Image Enhancement Method in IEEE Intl. Conf. on Systems, Man and Cybernetics," pages 243 to 247, 1991 point out that because of quantization errors, this two-step algorithm can produce contouring artifacts. Instead, they propose a direct method that matches the pair of histograms such that each intensity level i is mapped to a corresponding intensity j that minimizes $|H_i^A - H_j^B|$, where $H_i$ is the cumulative histogram for the first i intensities. This approach significantly reduces artifacts due to contouring. Y. J. Zhang in an article entitled "Improving the Accuracy of Direct Histogram Specification," in Electronics Letters, volume 28, number 3, pages 213 and 214, 1992 showed that the direct method (called SML) can produce poor results because each source intensity is independently mapped to a destination intensity. Zhang suggested modifying the cost function to $|H_{f(i)}^A - H_j^B|$, where f(j) is a monotonic mapping function, to take advantage of the fact that in general the destination histogram contains less intensities than the source histogram. This method for histogram specification (called GML) produces good matches and the computation is simple. However, the local search for matches introduces artifacts (spikes in the matched histograms) because matching errors accumulate.

The example shown in FIGS. 1a to 1d illustrates the effect. Intensity values 1 through 4 occur more frequently in the image in FIG. 1a while intensity values 7 through 10 occur more frequently in the image in FIG. 1b. Clearly though, the mapping should be one to one, i.e. $I_i^A = I_i^B$. However, the matching of $I_{1,2,3}^A$ with $I_{1,2,3}^B$ results in a cumulative error of 0.03, which is subsequently reduced by matching $I_{4,5}^A$ to $I_{4,5}^B$. These errors are further propagated, as illustrated in FIG. 1c. By matching histograms using dynamic histogram warping, this problem is avoided and better matching is thereby achieved as shown in FIG. 1d. A further distinction between the two procedures is that while histogram specification only alters one histogram, DHW (dynamic histogram warping) in accordance with the present invention allows both histograms to be simultaneously modified. The benefit of this is obvious when an intensity bin in one histogram needs to be expanded to many bins in the other. In practice, this is not possible. However, an expansion of one histogram implies a corresponding compression of the other histogram, which is easily accomplished when both histograms are allowed to be modified.

Dynamic histogram warping can be used to replace histogram specification. In many applications, the second histogram is interactively specified by the user. Dynamic histogram warping can be used to match an image histogram to a user specified (drawn) histogram.

SUMMARY OF THE INVENTION

Forty nine image pairs from the SRI JISCT stereo database were examined and it was empirically demonstrated that the CIB assumption is often erroneous. Inspection of corresponding histogram pairs revealed that the common additive (DC bias) and linear ($I_A=\beta I_B+\alpha$) models are not good models of the intensity relationship between the two images.

The deviation from constant image brightness is probably due to several factors including variations in illumination, camera responses and non-linear automatic gain controls. If these factors are lumped together and represented as an arbitrary non-linear monotonically increasing function that uniquely maps intensity values in image A to intensity values in image B, then errors in the constant image brightness assumption can be corrected, or at least reduced, by matching the intensity histograms of the two images.

Conventional histogram specification based on local matching corresponding cumulative histograms was shown to be problematic since errors propagate and accumulate and must then be compensated by spurious intensity matches. Instead, a dynamic histogram warping is disclosed analogous to dynamic time warping, that works directly on the intensity histograms by expanding or compressing intensity bins. One-to-one and one-to-many mappings are allowed. The algorithm can easily be extended to accommodate many-to-many mappings.

Dynamic histogram warping was applied to 14 image pairs from the SKI JISCT database that had previously been identified as not meeting the CIB assumption. An examination of the corrected histograms indicated very close matchings that were superior to those achievable by conventional histogram specification.

DHW is a front-end preprocessing stage to computer vision algorithms. Applying a maximum likelihood stereo algorithm to an image pair that originally deviated significantly from the CIB assumption showed that while the original disparity map contained many errors, a reduction in errors was achieved by first normalizing the images using DHW.

The constant image brightness assumption is central to many computer vision algorithms and the dynamic histogram warping algorithm forming the present invention provides a powerful method for measuring the validity of the CIB assumption and correcting for deviations. Moreover, because DHW does not require image derivatives, it does not amplify high frequency noise. As a result, it may be possible to apply existing stereo, optical flow and color indexing algorithms to noisier imagery than was previously possible.

The present invention is also applicable to color images as well as black and white images. In the case of color images, each image has three histograms (e.g. red, green and blue) and the red histogram from one image is matched to the red histogram from the other image and so forth for the green and blue histograms. Each color pair is matched independently of the other colors. Multispectral images can also be processed in a similar manner.

Variations of the dynamic histogram warping algorithm can provide a measure of the similarity between two histograms or other one dimensional projections of the image. These similarity measures may be used for purposes of image database retrieval based on query by content.

A principal object of the present invention is therefore, the provision of a dynamic histogram warping of image pairs for constant image brightness, histogram matching and histogram specification.

Another object of the present invention is the provision of an expansion/contraction matching of the intensity histograms to measure the degree of validity of constant image brightness (CIB) assumption and to correct for errors in the CIB assumption.

Further and still other objects of the present invention will become more clearly apparent when the following description is read in conjunction with the accompanying drawing.

BRIEF DESCRIPTION OF THE DRAWING

FIGS. 1a to 1d are graphical representations of histogram specifications;

FIGS. 2 to 5 are intensity histograms for JISCT image pairs;

FIG. 10a illustrates histogram matching of one intensity to one or many intensities;

FIG. 10b illustrates histogram matching of many intensities to many intensities;

DETAILED DESCRIPTION OF THE INVENTION

Figure 2A:
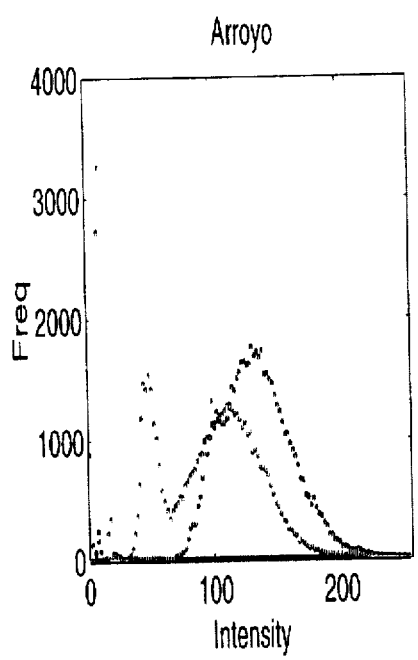
Figure 2B:
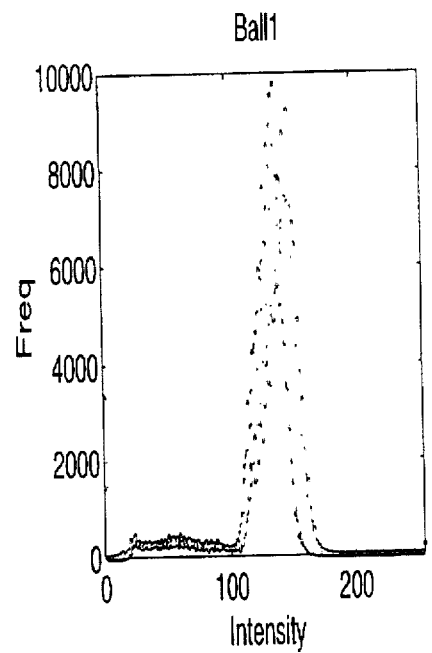
Figure 2C:
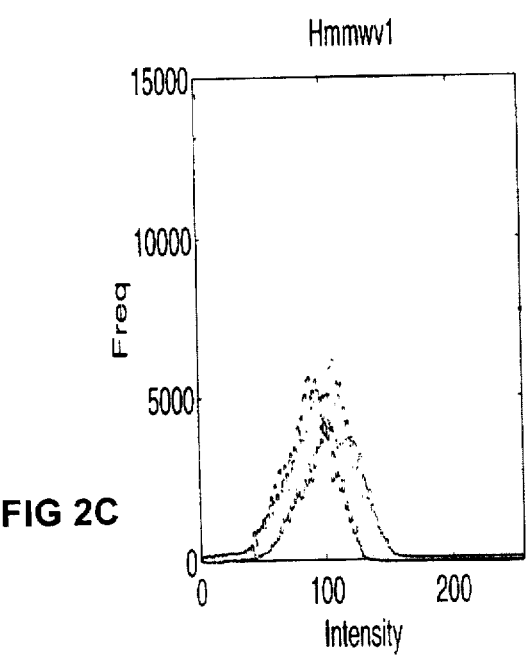
Figure 2D:
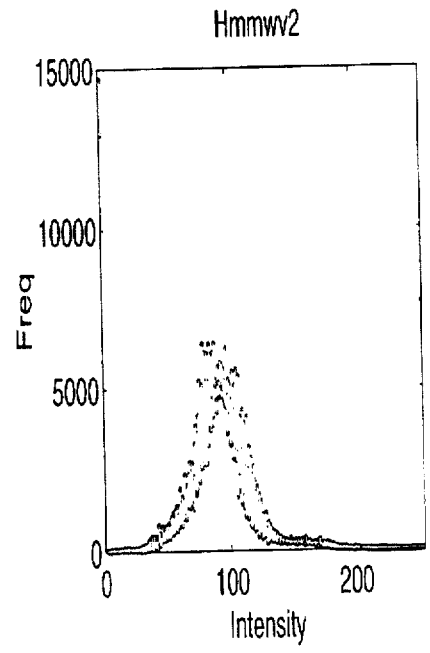
Figure 3A:
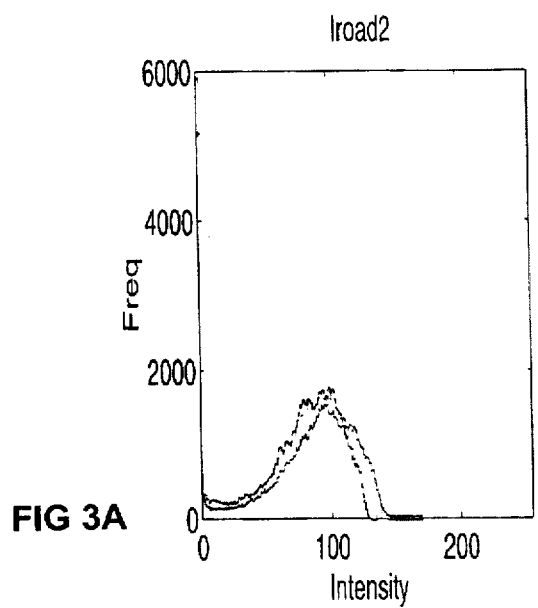
Figure 3B:
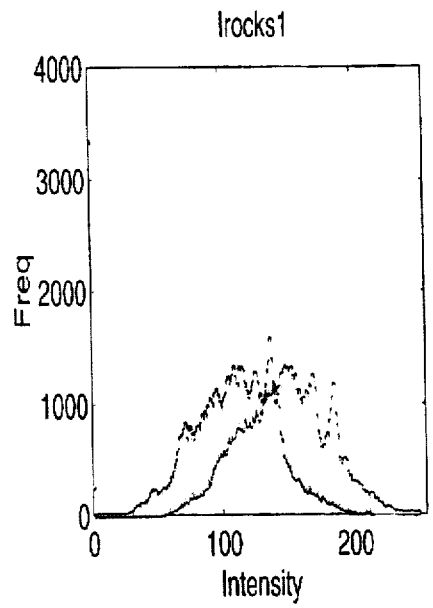
Figure 3C:
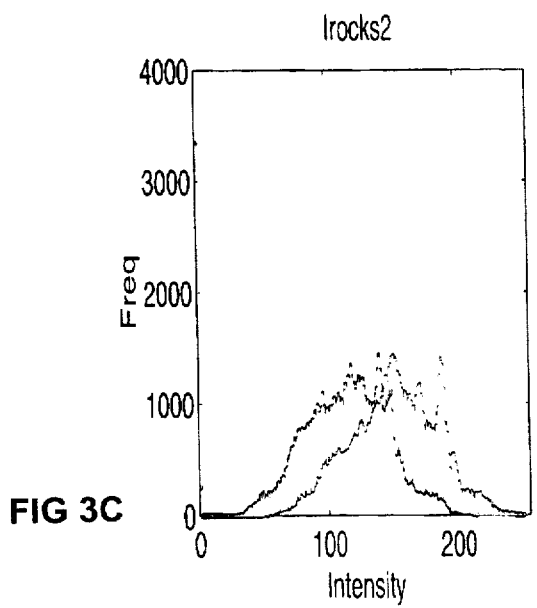
Figure 3D:
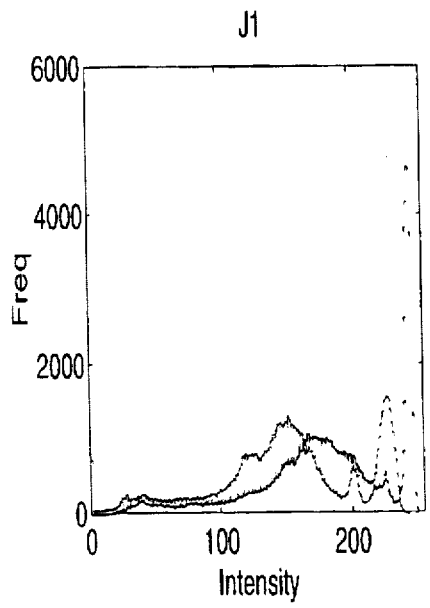
Figure 4A:
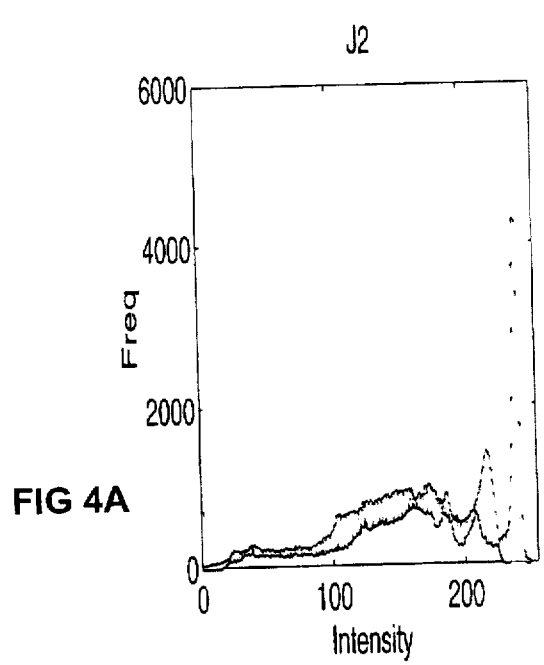
Figure 4B:
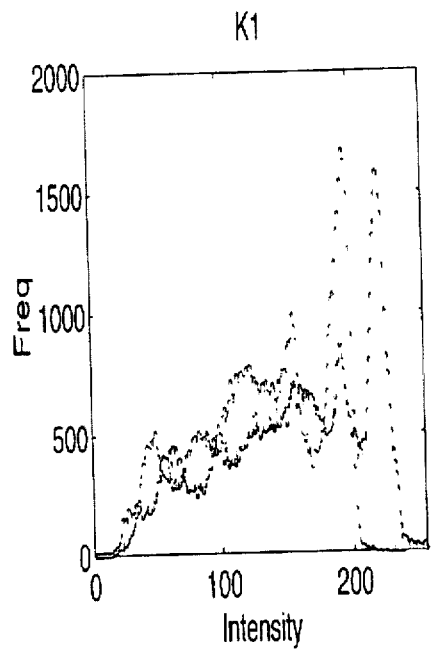
Figure 4C:
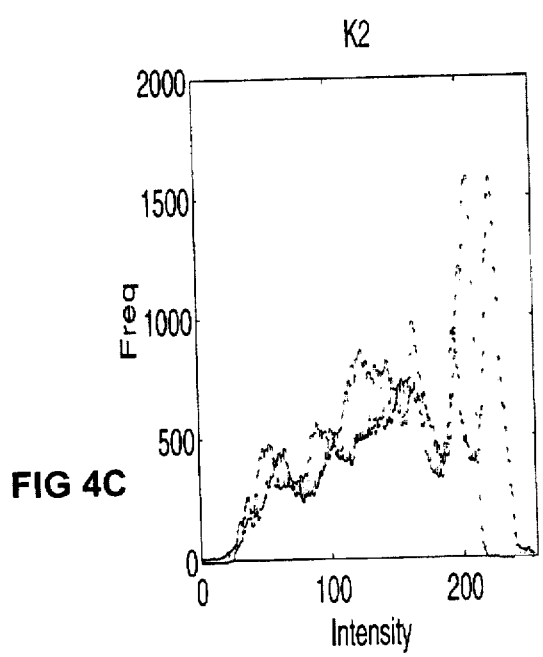
Figure 4D:
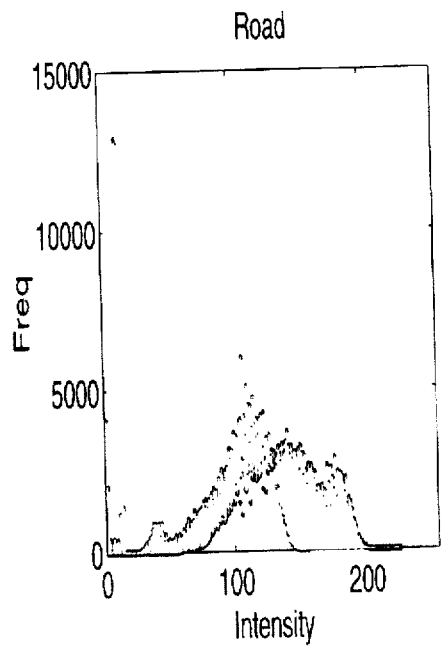
Figure 6A:
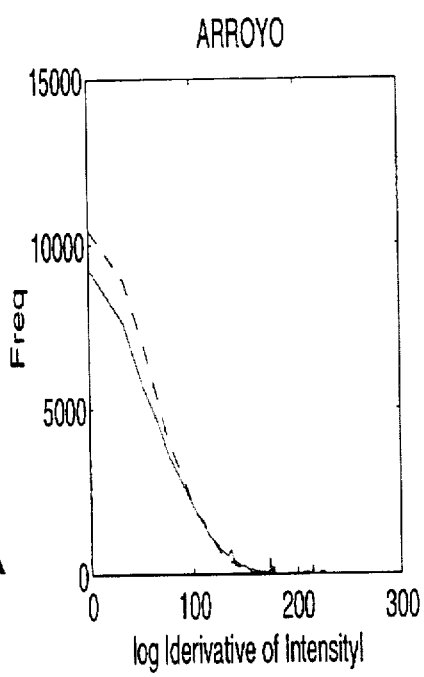
FIGS. 6 to 9 are normalized log derivative intensity histograms for JISCT image pairs.
Figure 6B:
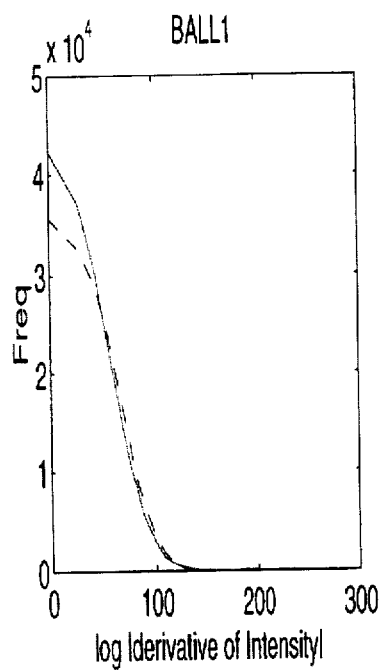
Figure 6C:
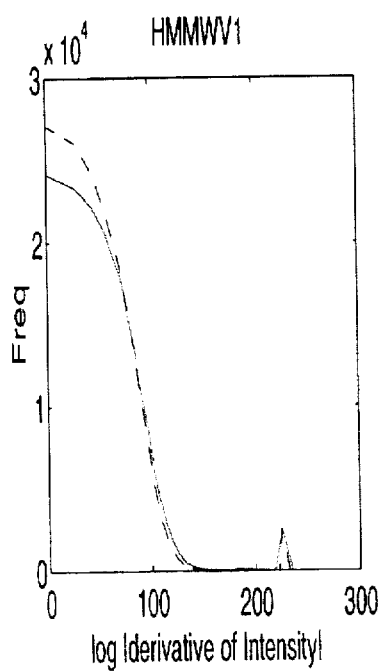
Figure 6D:
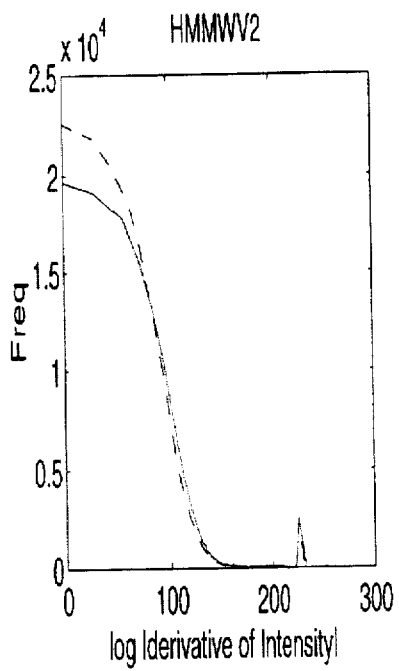
Figure 7A:
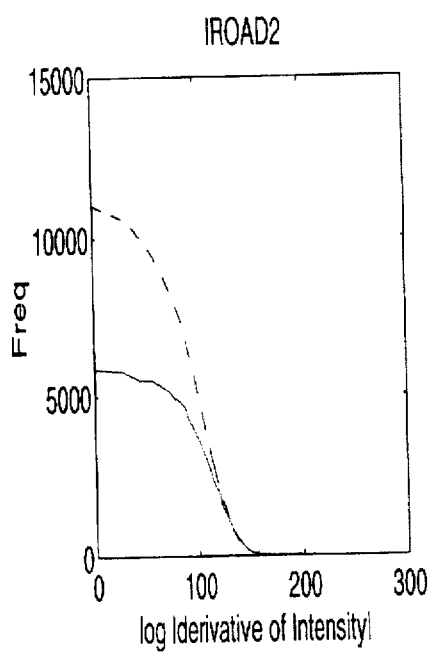
Figure 7B:
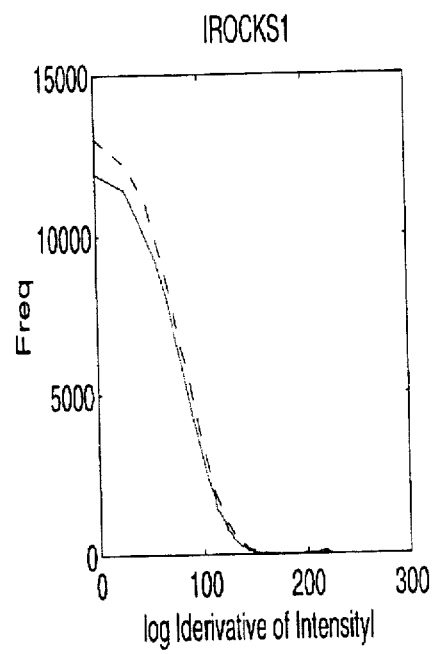
Figure 7C:
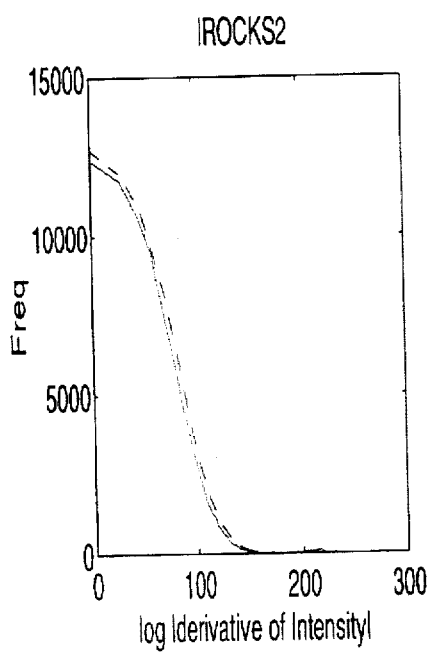
Figure 7D:
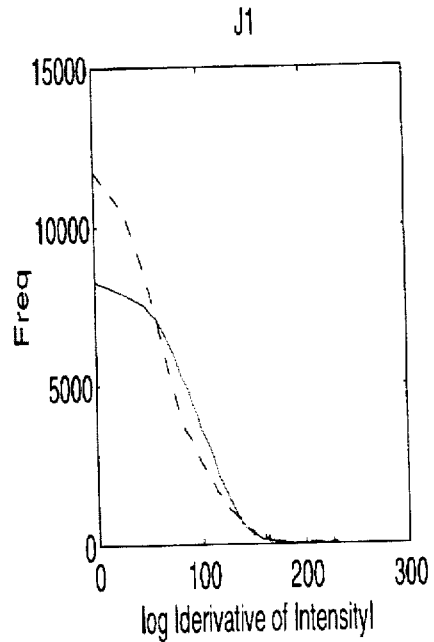
Figure 8A:
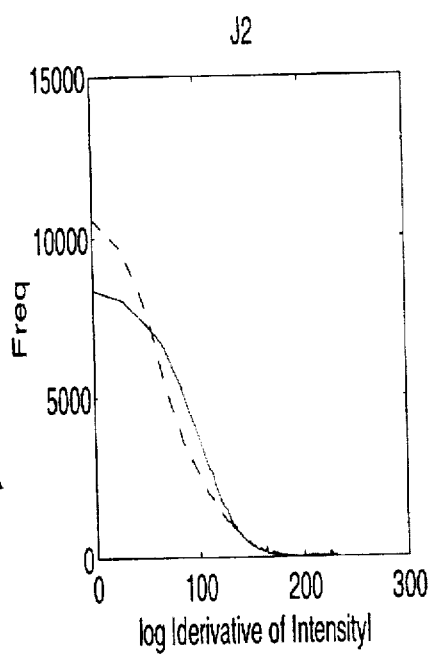
Figure 8B:
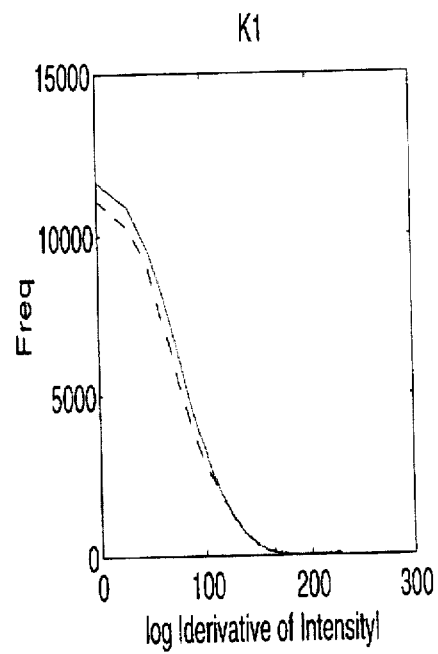
Figure 8C:
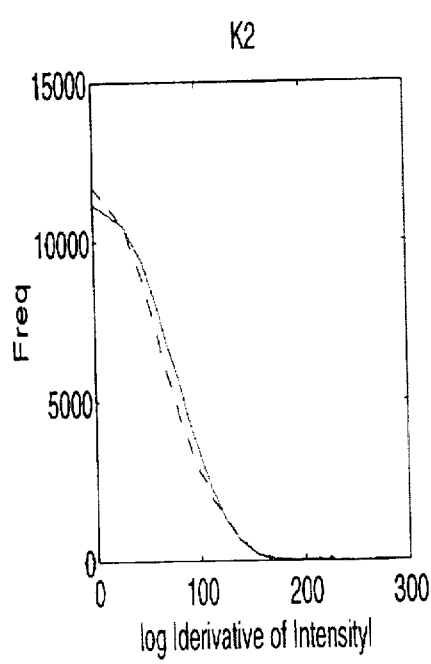
Figure 8D:
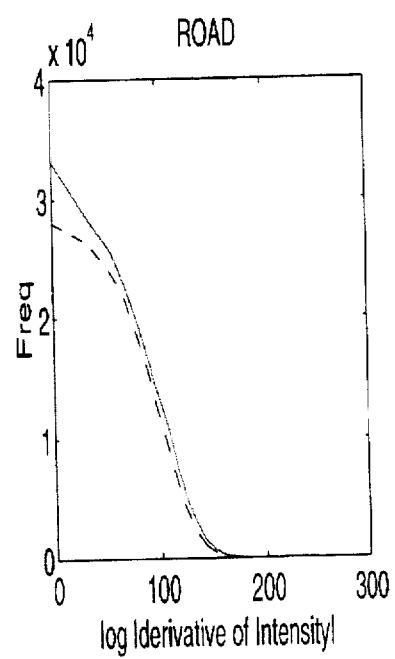
Figure 9A:
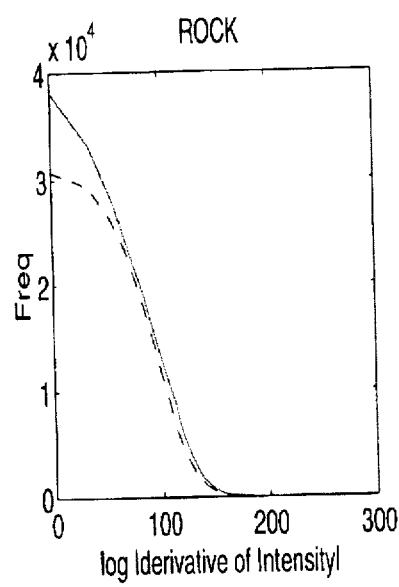
Figure 9B:
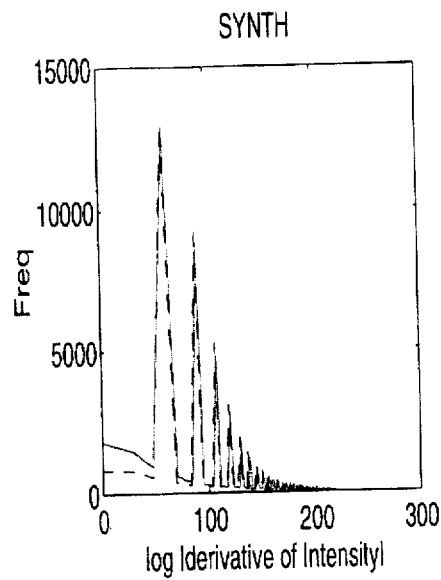
Figure 9C:
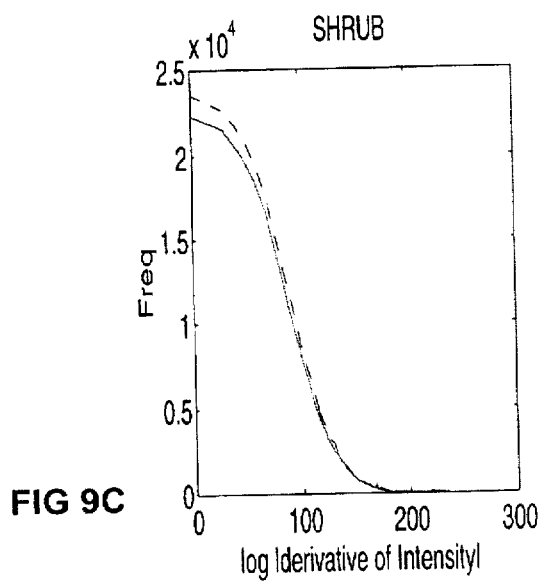
Figure 11A:
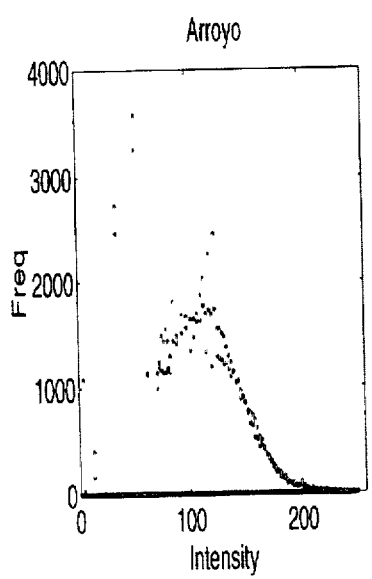
FIGS. 11 to 14 are intensity histograms after dynamic histogram warping image matching.
Figure 11B:
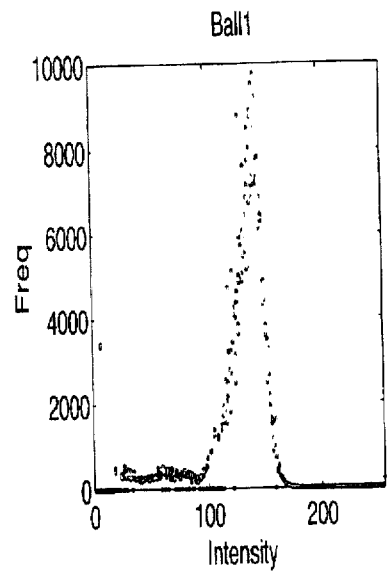
Figure 11C:
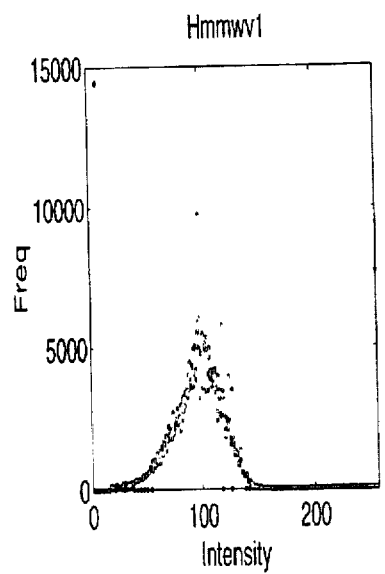
Figure 11D:
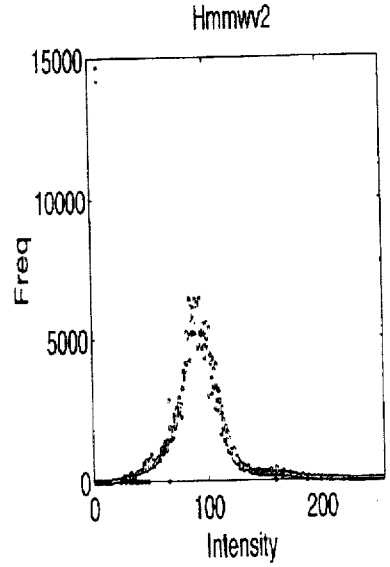
Figure 12A:
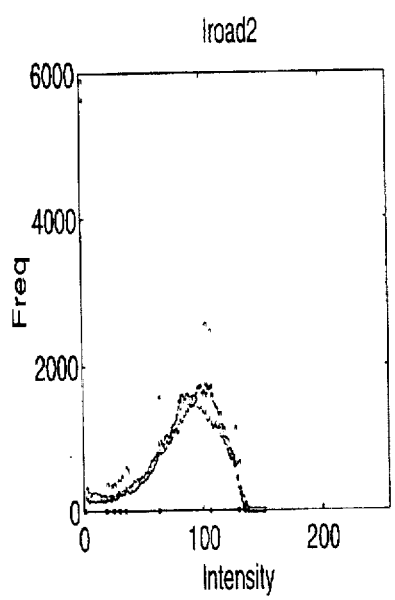
Figure 12B:
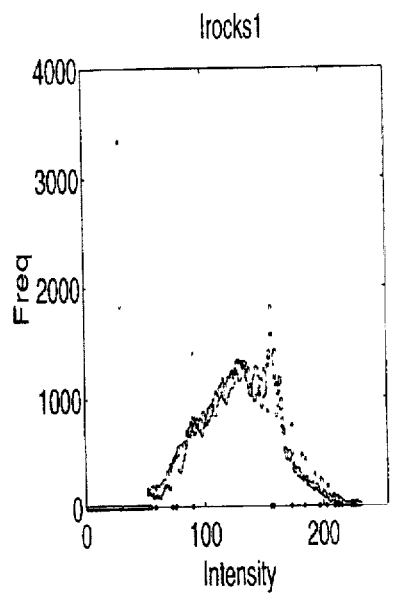
Figure 12C:
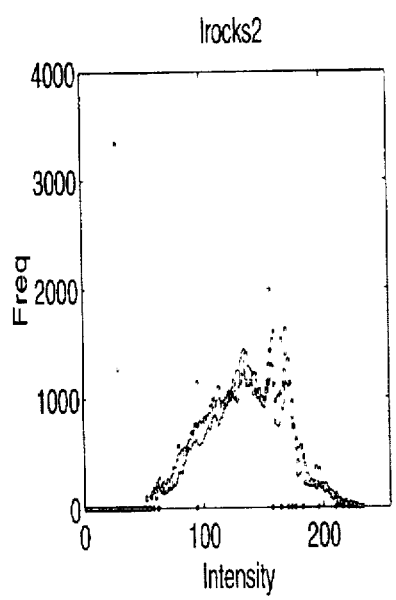
Figure 12D:
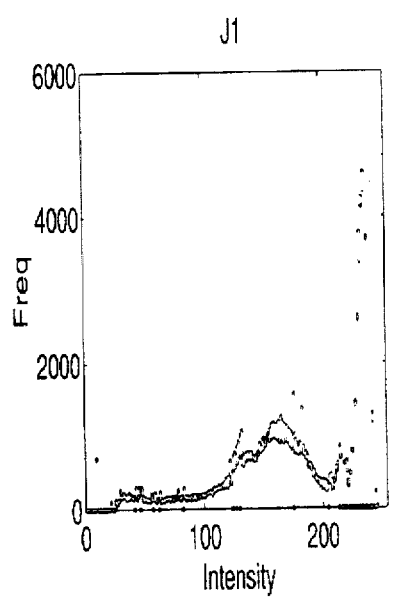
Figure 13A:
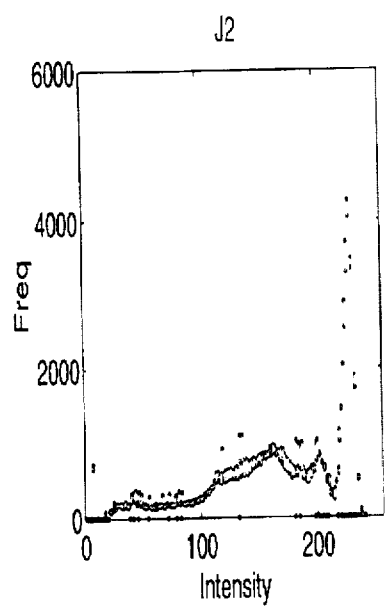
Figure 13B:
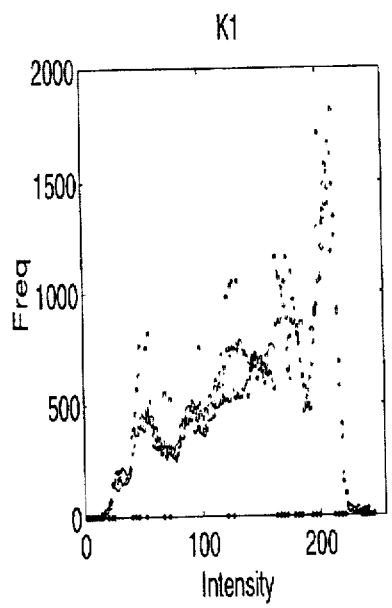
Figure 13C:
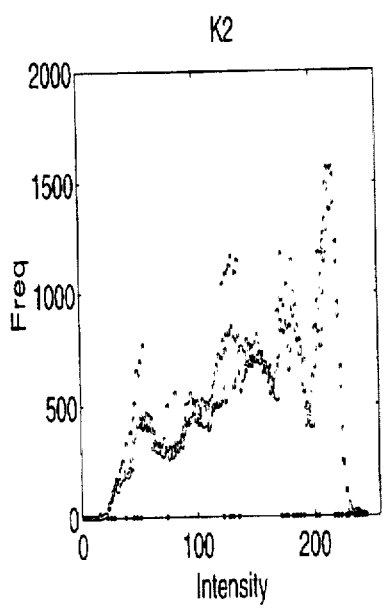
Figure 13D:
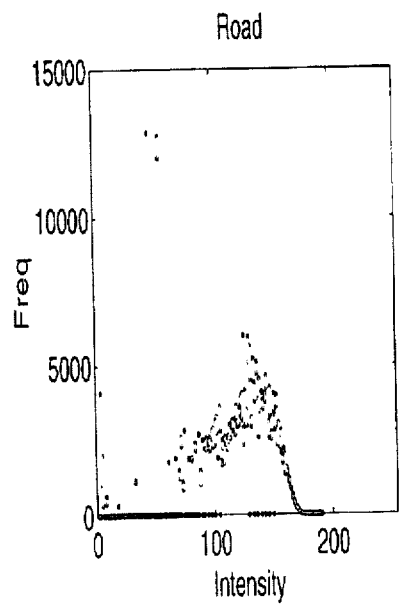
Figure 14A:
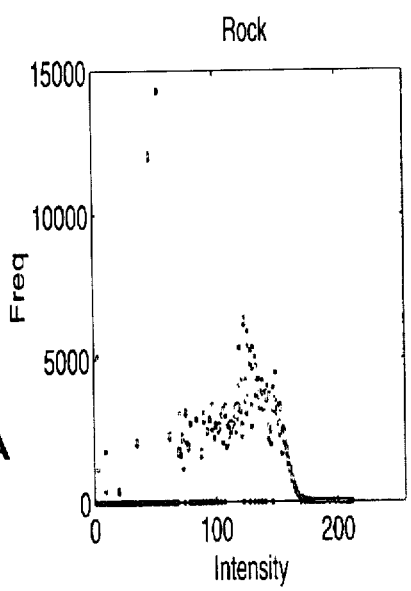
Figure 14B:
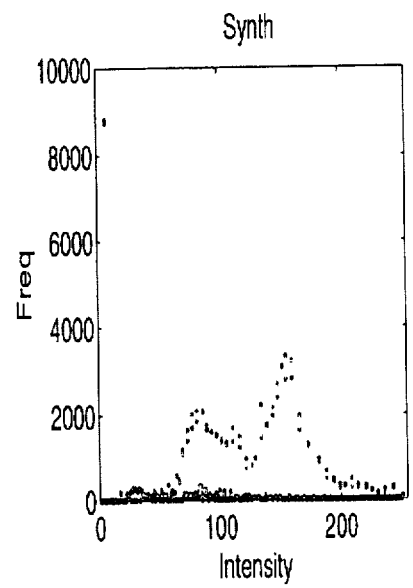
Figure 14C:
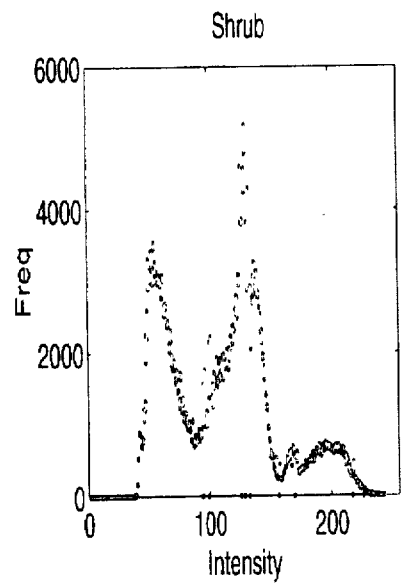
Figure 15A:
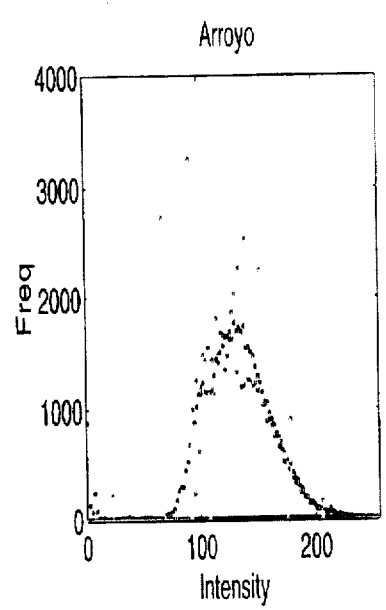
FIGS. 15 to 18 are intensity histograms after applying a conventional histogram specification (GML) algorithm to match intensity histograms.
Figure 15B:
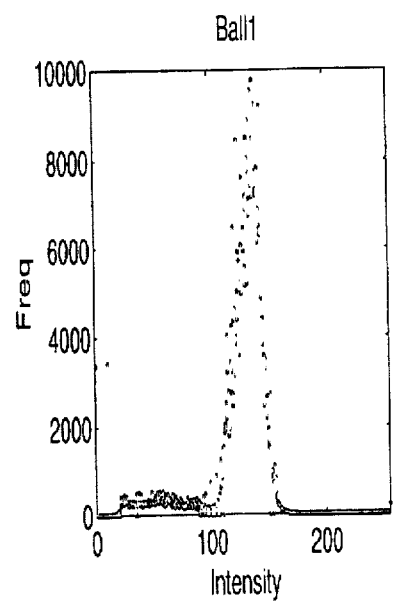
Figure 15C:
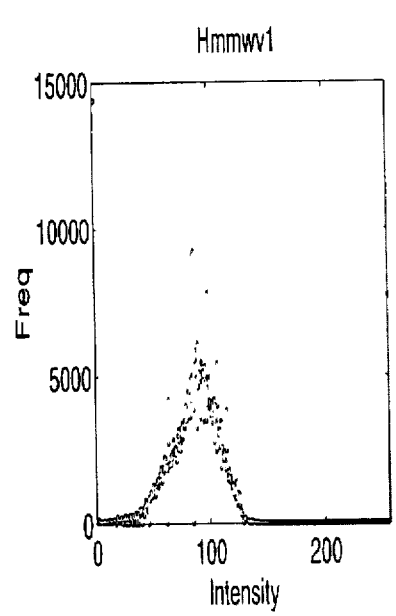
Figure 15D:
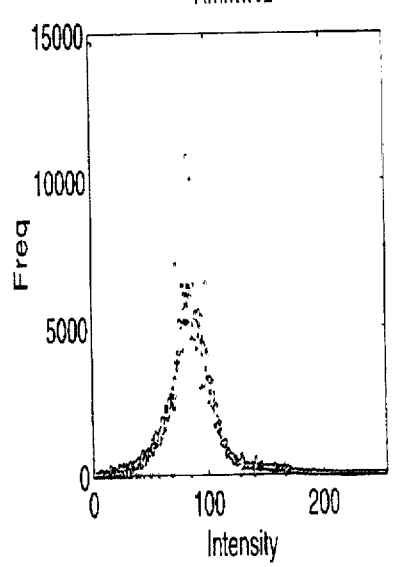
Figure 16A:
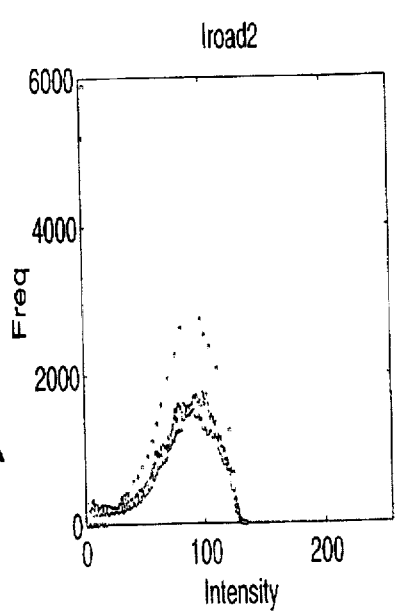
Figure 16B:
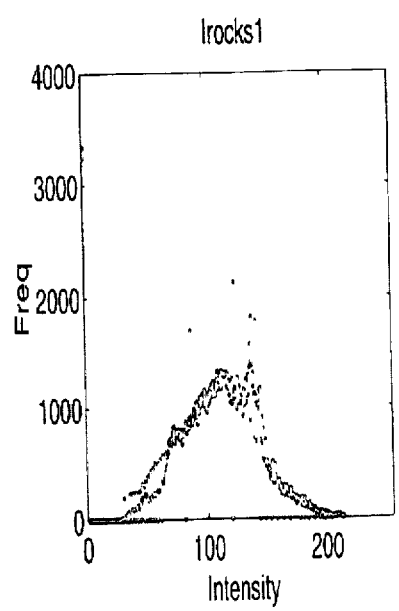
Figure 16C:
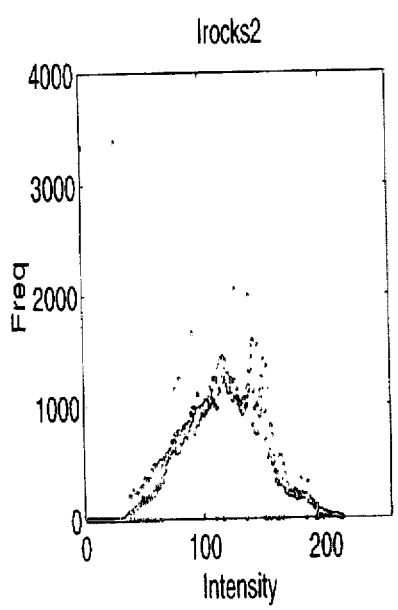
Figure 16D:
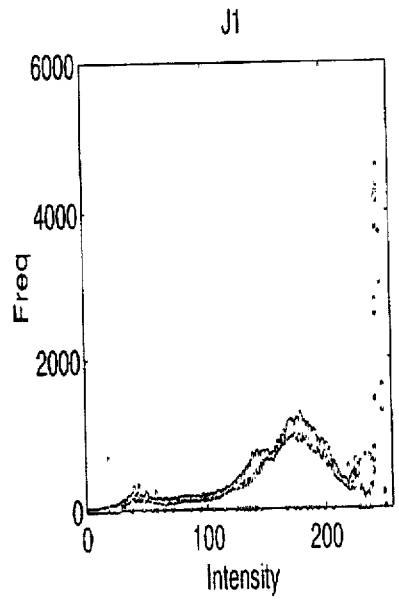
Figure 17A:
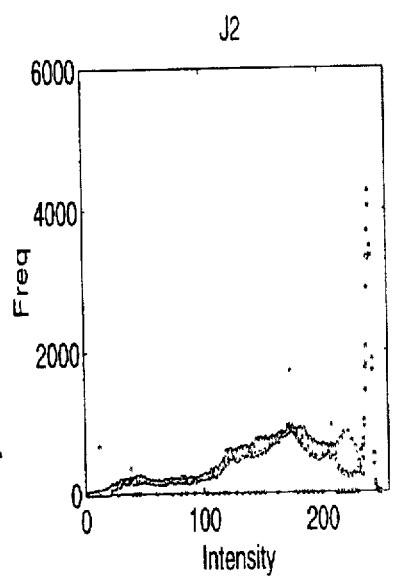
Figure 17B:
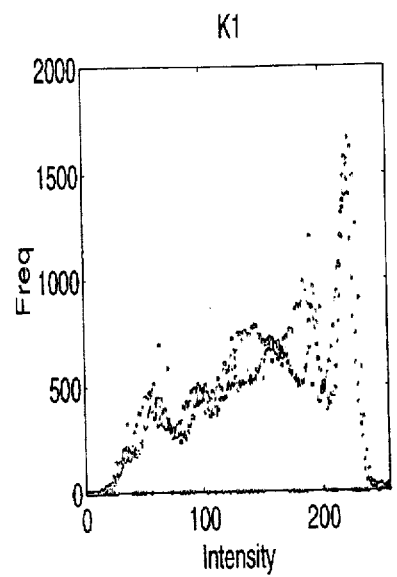
Figure 17C:
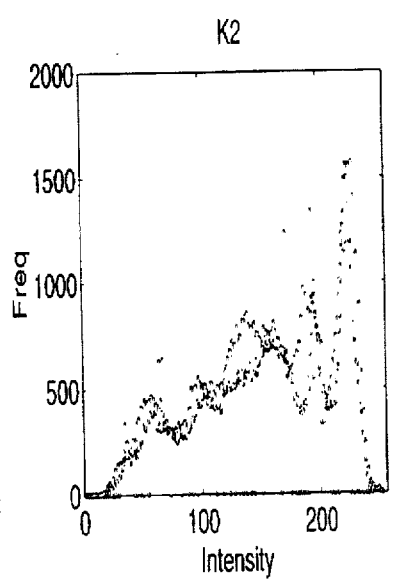
Figure 17D:
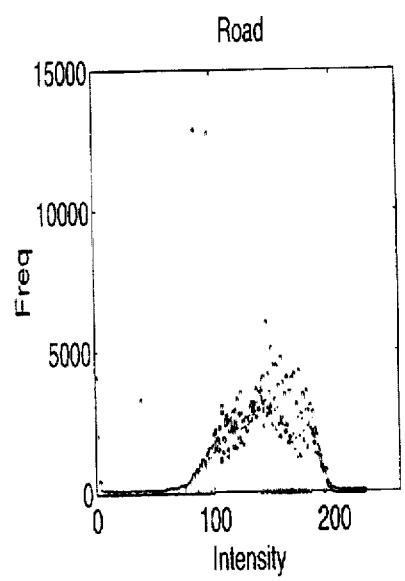
Figure 18A:
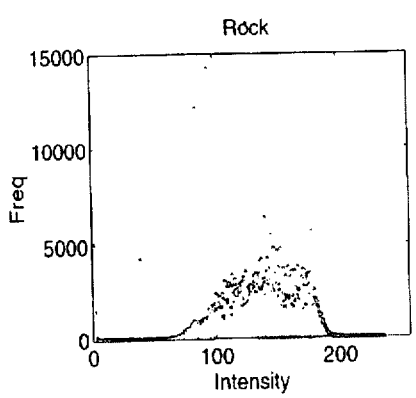
Figure 18B:
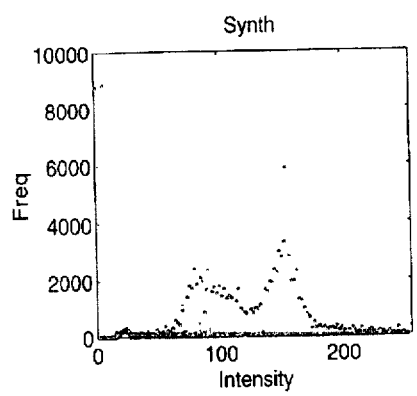
Figure 18C:
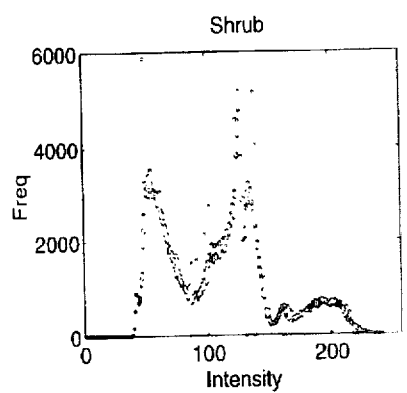
Figure 19:
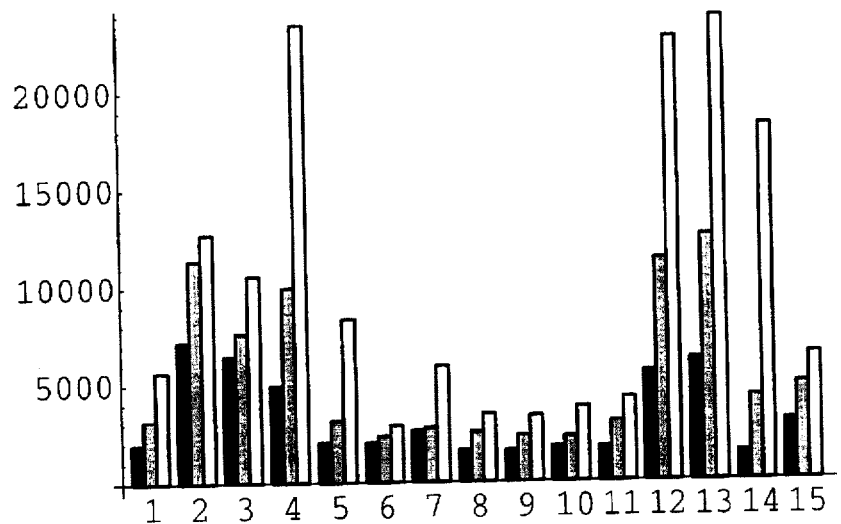
FIG. 19 is a sum of square differences for difference between resulting histograms of applying different methods.

The SRI JISCT database is a collection of 49 stereo pairs from five sites: JPL, INRIA, SRI, CMU and Teleos. To determine the accuracy of the CIB assumption, corresponding intensity histograms for each of the stereo pairs were examine, since if the CIB assumption is valid, their intensity histograms should be almost identical. FIGS. 2 to 5 show that for the 15 cases illustrated, the CIB assumption was clearly not valid. Vertical lines have been drawn between corresponding points in each pair of histograms: the longer the line, the bigger the difference between the histograms at that point. The differences between corresponding histograms reveals that a DC bias, i.e. $I_A=I_B+\alpha$, is not an accurate model of the intensity relationship. This is clear from the histograms of "J2" in FIG. 4 in which the dark intensity portion of the histogram is well matched but progressively greater deviations are apparent for brighter intensities. Also, the histograms of the the "ARROYO" pair of FIG. 2 are clearly structurally different.

In order to determine the validity of the constant additive and multiplicative model, i.e. $I_A=\beta I_B+\alpha$, the derivative of each image was first taken to remove the DC bias. Then, the histograms of the logs of the magnitude of the image derivatives were computed. If the CIB assumption was an accurate model, then corresponding histograms of the log of absolute derivatives should be shifted versions of one another. FIGS. 6 to 9 which illustrate the normalized log derivative intensity histogram for sample JISCT image pairs, clearly show that this is not the case. In particular, several of the figures appear to be scaled versions of one another, see FIG. 9 for example, indicating that some form of power law relationship may be present.

This analysis shows that not only is the constant image brightness assumption often invalid, but also that the simple constant or linear models for the deviation do not adequately represent the imaging process. The analysis suggests that an alternative model for the relationship between the two sets of intensities might be a non-linear model of the form $I_A = \beta I_B^\gamma + \alpha$.

Possible reasons for a pair of images to deviate from the CIB assumption for some scenes, assuming that the image content remains the same, include (1) variations in illumination, (2) variations in camera signal response and (3) the time-varying non-linear automatic gain control of the cameras. If it is assumed that these factors can be lumped together and represented as an arbitrary non-linear monotonically increasing function that uniquely maps intensity values in image A to intensity values in image B, then errors in the constant image brightness assumption can be corrected, or at least reduced by matching the intensity histograms of the two images. Such a comparison and correction is related to work in sequence comparison described in the book by D. Sankoff et al entitled "Time Warps, String Edits and Macromolecules: The Theory and Practice of Sequence Comparison," published by Addison Wesley in 1983, and especially to dynamic time warping (DTW), commonly used in speech recognition to minimize variations in the rate of speech between speakers as described in the Sankoff et al book. In dynamic time warping, two speech signals are compressed and/or expanded to best match one another. Signal samples can be matched one-to-one, one-to-many (expansion) or many-to-one (contraction), as illustrated in FIG. 10a. However, the many-to-many mappings of FIG. 10b are not allowed in the DTW.

Because of quantization error, for example, many-to-many mappings were considered. However, while the differences in the resulting histograms were reduced with such mappings, the original shape of the histograms was often lost. Since it is desirable to retain the original shape as much as possible it was decided to follow DTW and not allow many-to-many mappings. However, the algorithm can easily be modified to accommodate many-to-many mappings if desired. The present invention extends dynamic time warping to histograms in the field of image processing.

To specify the cost of a matching, let $h_m^A$ and $h_n^B$ represent the frequency of occurrence of the mth and nth intensity values in images A and B respectively. Let $H_m^A$ and $H_n^B$ represent the cumulative frequency of occurrence such that $H_m^A = \Sigma_{i=1}^m h_i^A$ and $H_n^B = \Sigma_{i=1}^n h_i^B$. Then the usual cost of matching intensity $I_m^A$ of image A with intensity $I_n^B$ in image B is simply $|h_m^A - h_n^B|$. This is appropriate for a one-to-one mapping. However, for histograms the quantities being compared are the number of occurrences of intensity values. Thus, for a one-to-two mapping, for example, the cost should be $|h_m^A - (h_n^B + h_{n-1}^B)|$ and for a one-to-k mapping $|h_m^A - \Sigma_{i=0}^{k-1} h_{n-i}^B|$. The fact that the cost of matching $h_{m+1}^A$ to $h_n^B$ depends on whether or not $h_m^A$ was matched to $h_n^B$, complicates the dynamic programming. However, since the maximum size of a compression or expansion is always finite in the limit one-to-N, where N is the range of intensity values, then such a cost function can be accommodated. See, for instance, W. A. Gale et al article entitled "A program for aligning sentences in bilingual corpora," in the 29th Annual Meeting of the Association for Computational Linguistics, pages 177 to 184, 1991. In general, the cost of a k-to-l mapping is $$d_{k,l}(m,n) = \left| \sum_{i=0}^{k-1} h_{m-i}^A - \sum_{j=0}^{l-1} h_{n-j}^B \right| = |(H_m^A - H_{m-k}^A) - (H_n^B - H_{n-l}^B)|$$

Finally then, it is necessary to define the total cost of a matching. This cost is defined recursively as $$D(0,0) = 0$$
$$D(i,j) = \infty \quad (i \leq 0, j \leq 0, (i,j) \neq (0,0))$$
$$D(m,n) = \text{Min}[D(m-k, n-l) + d_{k,l}(m,n)]$$
$$1 \leq k \leq M$$
$$1 \leq l \leq N$$
$$(k-1)(l-1) = 0$$

where M and N represent the maximum allowable compression of the respective histograms and the constraint that $(k-1)(l-1)=0$ prevents many-to-many mappings. The cost function can be efficiently minimized via dynamic programming.

Traditional histogram specification assumes one histogram has a fixed reference. DHW is also capable of such constructions but is also more flexible since it is possible to simultaneously warp both histograms, replacing expansions of one histogram by corresponding compressions of the other.

The dynamic histogram warping algorithm was applied to the images whose original histograms were shown in FIGS. 2 to 5. FIGS. 11 to 14 show the resulting histograms after image matching. It is clear that very close matching has been achieved.

In comparison, FIGS. 15 to 18 show the results of applying a conventional histogram specification (GML) algorithm to match intensity histograms without initially applying the dynamic histogram warping algorithm. Although reasonably good matching is achieved, spurious matches, in the form of spikes, are clearly visible.

Figure 20A:
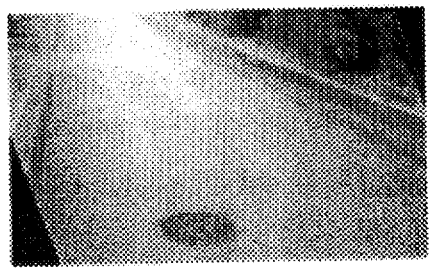
FIG. 20 shows a stereo pair of images from the SRI JISCT database.
Figure 20B:
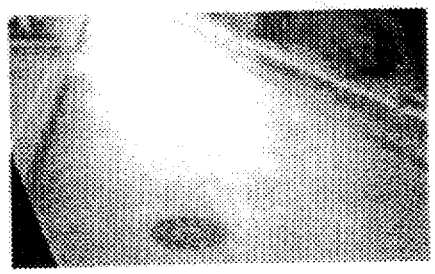

The difference between resulting histograms, measured as a sum of squared differences $$(e = \sqrt{\Sigma_i (h_i^A - h_i^B)^2}),$$

is shown in FIG. 20 for three different methods applied to the 15 test image pairs. The black graphs are the results of applying the dynamic histogram warping method of the present invention. The shaded graphs are the results of applying a regular normalization algorithm (GML). The white graphs are the results of applying a regular histogram algorithm (GML). The dynamic histogram warping (in black) always yields a smaller error then regular normalization or specification.

As an example of the type of correction achieved is shown in FIG. 20 illustrating the original pair of images, "IROAD2", from the JISCT database. A stereo algorithm was applied to this pair of images (1) with no correction, (2) correction using a linear model of the intensity relationship, (3) correction using regular histogram specification and (4) correction using dynamic histograms warping. The corresponding disparity maps are shown in FIGS. 21a to 21d, respectively.

Figure 21A:
FIGS. 21a to 21d are disparity maps of the images in FIG. 20 after further image processing.
Figure 21B:
Figure 21C:
Figure 21D:

With no histogram correction, the disparity map shown in FIG. 21a is extremely poor. While the linear model shown in FIG. 21b substantially improves the disparity output, some artifacts are present, mostly on the upper left portion. Both histogram specifications in FIG. 21c and DHW in FIG. 21d remove this artifact but histogram specification (FIG. 21c) introduces some additional error in the left foreground.

Figure 22:
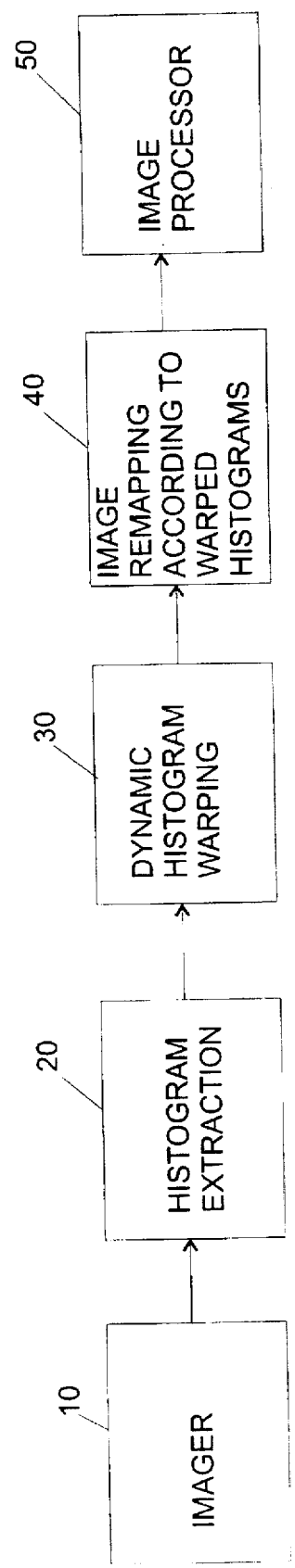
FIG. 22 is a schematic diagram of a preferred embodiment of the invention.

Having described the concepts and experimental results achieved in practicing the present invention, FIG. 22 schematically illustrates a preferred embodiment of the invention. An imager 10 provides two images, i.e. an image pair, of a scene. The images can be stereo images of a stationary scene or a motion sequence of a moving or changing scene.

The primary object of the invention is to provide a method and apparatus for processing the two images so that the images are of substantially equal or constant brightness. That is, the images have mapped intensities such that their respective histograms are approximately identical. Conventional methods involve stereo imaging or optical flow algorithms which assume the presence of images having equal histograms or equal brightness. As described above, these assumptions are frequently incorrect. Therefore, the two images from imager 10, which may comprise cameras or other image detectors, are subjected to the dynamic histogram warping. That is, the histograms are first extracted from the image pair 20 and then subject to dynamic histogram warping 30 and the warped histograms are used to remap the original images 40. The steps of extracting the histograms, performing dynamic histogram warping and remapping the image are preferably performed using dynamic programming in a computer, as described above.

The resulting remapped images are provided to an image processor 50 for conventional processing using algorithms which while assuming the presence of images of equal brightness, have heretofore not always been able to process images with equal brightness. By pre-processing the image pair using dynamic histogram warping, the image brightness of the two images provided to processor 50 are substantially equal, thereby enabling improved image processing using conventional image processing algorithms.

The present invention resides in the pre-processing dynamic histogram warping of the two images. The images may be in any form, but preferably the image is in digitized format for pre-processing.

Instead of using two images of a scene, one or both of the images can be a histogram specification. That is, only the histogram need be subjected to the dynamic histogram warping in which case the output is not two corrected images, but is a matching between two histograms which can be used in subsequent image processing. Moreover, one of the histograms may be artificially specified by a user, rather than be calculated from an image.

Application of the invention is found in optical flow estimation, motion and structure, stereo, recognition based on color histograms, and conventional histogram specification.

While there has been described and illustrated a method and apparatus for dynamic histogram warping of image pairs for constant image brightness, it will be apparent to those skilled in the art that variations and modifications are possible without deviating for the broad teachings and spirit of the invention which shall be limited solely by the scope of the claims appended hereto.

What is claimed is:

1. An apparatus for dynamic histogram warping of image pairs comprising:

an imager for providing an image pair of a scene;

computer coupled to said imager for receiving said image pair of a scene and extracting the histograms of the images, subjecting the histograms to dynamic histogram warping and then remapping the image according to the warped histogram, where said computer determines the minimum total cost of a matching according to:

$$D(0,0) = 0$$
$$D(i,j) = \infty \ (i \leq 0, j \leq 0, (i,j) \neq (0,0))$$
$$D(m,n) = \text{Min}[D(m-k, n-l) + d_{k,l}(m,n)] \quad \begin{array}{l} 1 \leq k \leq M \\ 1 \leq l \leq N \\ (k-1)(l-1) = 0 \end{array}$$

where D is the total cost, M and N are the maximum allowable compression of the histograms, m and n are the intensity values of the first image and the second image of the image pair of the scene, $d_{k,l}$ is the cost of a k-to-l mapping, for generating an image or image pair having specified histogram characteristics; and image processor coupled to said computer for receiving said remapped image or image pair and processing said remapped image pair.

2. An apparatus for dynamic histogram warping of image pairs as set forth in claim 1, where said image pair of a scene are stereo images of a stationary scene.

3. An apparatus for dynamic histogram warping of image pairs as set forth in claim 1, where said image pair of a scene is a motion sequence.

4. An apparatus for dynamic histogram warping of image pairs as set forth in claim 1, where one image of said image pair is a histogram specification.

5. A method of dynamic histogram warping of image pairs comprising the steps of:

providing an image pair of a scene;

extracting the histograms of the images;

performing dynamic histogram warping of said extracted histograms by determining the minimum total cost of a matching according to:

$$D(0,0) = 0$$
$$D(i,j) = \infty \ (i \leq 0, j \leq 0, (i,j) \neq (0,0))$$
$$D(m,n) = \text{Min}[D(m-k, n-l) + d_{k,l}(m,n)] \quad \begin{array}{l} 1 \leq k \leq M \\ 1 \leq l \leq N \\ (k-1)(l-1) = 0 \end{array}$$

where D is the total cost, M and N are maximum allowable compression of the histograms, m and n are the intensity values of the first image and the second image of the image pair of a scene, $d_{k,l}$ is the cost of a k-to-l mapping;

remapping the images according to the warped histograms; and processing the remapped image pair.

6. A method of dynamic histogram warping of image pairs as set forth in claim 5, where said providing an image pair of a scene provides stereo images of a stationary scene.

7. A method of dynamic histogram warping of image pairs as set forth in claim 5, where said providing an image pair of a scene provides a motion sequence.

8. A method of dynamic histogram warping of image pairs as set forth in claim 5, where said providing an image pair comprises providing a histogram specification.

\* \* \* \* \*